United States Patent [19]

Sato et al.

[11] 4,117,451

[45] Sep. 26, 1978

[54] APPARATUS FOR DETECTING VARIATION OF A CONDITION AMOUNT IN A MECHANICAL DEVICE

[75] Inventors: Kazuo Sato; Haruhiko Toriyama; Seiichi Matsushige, all of Toyota, Japan

[73] Assignee: Toyota Jidosha Kogyo Kabushiki Kaisha, Toyota, Japan

[21] Appl. No.: 713,194

[22] Filed: Aug. 10, 1976

Related U.S. Application Data

[63] Continuation of Ser. No. 486,431, Jul. 8, 1974, abandoned.

[51] Int. Cl.$^2$ .................. B60C 23/00; B60T 17/22; G08B 23/00
[52] U.S. Cl. .................. 340/52 A; 200/61.4; 200/52 R; 340/624; 340/679
[58] Field of Search .................. 340/52 R, 52 A, 58, 340/59, 60, 244 A, 244 E, 253 P, 253 R, 251, 152 T, 174; 200/61.4, 61.22, 61.25; 307/88 R; 331/65, 64, 148

[56] References Cited

U.S. PATENT DOCUMENTS

| | | | |
|---|---|---|---|
| 2,719,288 | 9/1955 | Young | 340/251 |
| 3,143,729 | 8/1964 | Power | 340/253 |
| 3,183,498 | 5/1965 | Midis et al. | 340/253 |
| 3,374,470 | 3/1968 | Massoubre | 340/58 |
| 3,556,258 | 1/1971 | Winge et al. | 188/1 A |
| 3,602,884 | 8/1971 | Brumbelow | 340/58 |
| 3,603,926 | 9/1971 | Kimura | 340/59 |
| 3,646,293 | 2/1972 | Howard | 200/84 C |
| 3,674,114 | 7/1972 | Howard | 188/1 A |
| 3,694,803 | 9/1972 | Strenglein | 340/58 |
| 3,858,174 | 12/1974 | Harris | 340/58 |
| 3,995,262 | 11/1976 | France et al. | 340/251 |

*Primary Examiner*—John W. Caldwell, Sr.
*Assistant Examiner*—Joseph E. Nowicki
*Attorney, Agent, or Firm*—Karl W. Flocks

[57] ABSTRACT

An apparatus for detecting variation of a condition in a mechanical device comprises a detecting transformer or plurality of such transformers provided with an input winding, a control winding and an output winding, an A. C. power source connected to said input winding, and a detecting element connected in series with said control winding. The normally closed detecting element is adapted to become open circuited in response to variation of the condition amount in said mechanical device. A required output signal is taken out and detected by an output circuit from the output winding due to the open circuiting of the detecting element.

8 Claims, 8 Drawing Figures

FIG. 1a
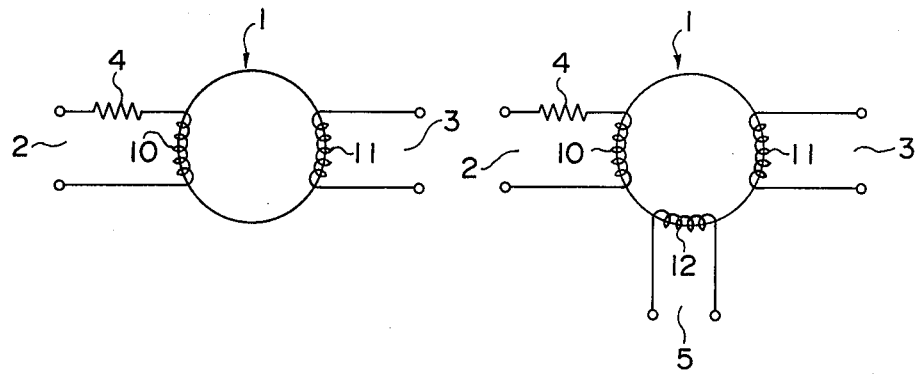
FIG. 1b
FIG. 2
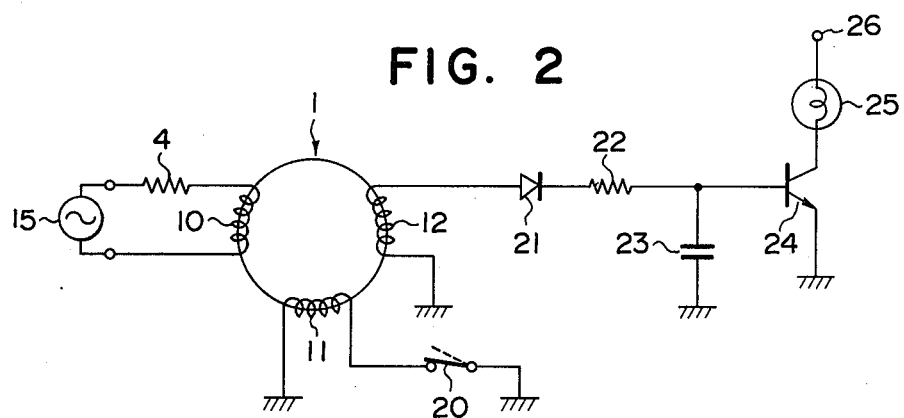
FIG. 3a
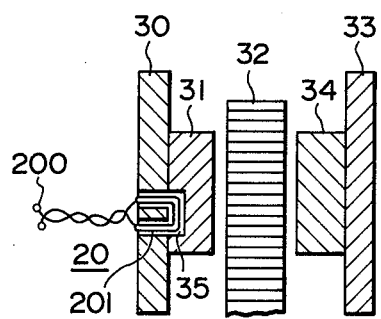
FIG. 3b
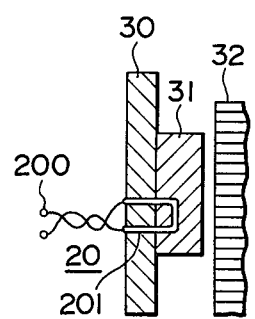

APPARATUS FOR DETECTING VARIATION OF A CONDITION AMOUNT IN A MECHANICAL DEVICE

This is a continuation of application Ser. No. 486,431, filed July 8, 1974, abandoned.

BACKGROUND OF THE INVENTION

1. Field of the Invention

This invention relates to an apparatus for detecting variation of at least one condition amount in various mechanical machines by utilizing variation of the impedance of at least one winding of an A.C. transformer (hereinafter, it is called a detecting transformer) due to open and close of the other winding thereof.

2. Description of Prior Art

In general, in a mechanical machine, it is accompanied with variation of the mechanical condition. For example, in a brake mechanism using a friction machine, the friction machine wears away in accordance with the used number of times or durability. Therefore, since the braking operation can not be effected if the friction machine wears away to unusable condition, the wear limit is predetermined and it is required to inform to the outside that the mechanical condition of said machine reached said limit when such situation occurs.

Generally, in a mechanical machine, there are variations of various mechanical conditions other than that in said brake mechanism. There are mechanical mechanism and an electrical detecting mechanism as such detecting mechanism for detecting variation of mechanical condition and at present the electrical detecting mechanism is frequently used. The electrical detecting mechanism is composed of a detecting element such as a transistor. This example using the transistor has reliability for a static type mechanical machine and a mechanical machine used under environment with a little temperature variation but little reliability for a vibrating type mechanical machine and a mechanical machine used under environment with large temperature variation.

SUMMARY OF THE INVENTION

A main object of the invention is to provide a reliable apparatus for detecting variation of condition. Another object of the invention is to provide an apparatus for detecting variation of condition which can be constructed simply and easily.

A definite object of the invention is to provide an apparatus for detecting variation of condition wherein the unique characteristic of a detecting transformer such as an A.C. transformer is utilized so as to detect variation of condition.

In the invention, the detecting transformer has a primary winding, a secondary winding and a control winding as a third winding. A condition-variation-detecting element is connected to this control winding.

The condition-variation-detecting element, in general, has switching arrangement. For example, in a brake device using a friction member wears away and then reaches a limit point, a copper plate is cut off and as a result, there occurs electrical "off" state.

Namely, the detecting element made of a copper plate acts as a switch.

The above example is caused to have a resultant switching function, but there is another example directly using a switching element.

For example, in the case of detecting variation of volume of liquid such as an oil, a switch element (usually, it is called a lead switch) is directly provided to form a detecting element.

Accordingly, the control winding is switched by a detecting element having indirect or direct switch function. As a result of this switching of the control winding, namely, more typically, an output signal of the secondary winding varies in response to variation of condition due to short-circuit or non-short-circuit of the control winding. Consequently, variation of a condition amount can be detected by means of the output signal from the secondary winding.

BRIEF DESCRIPTION OF THE DRAWINGS

FIGS. 1a and 1b are circuit diagrams for explaining the principle of the invention;

FIG. 2 is a circuit diagram showing an embodiment of the invention;

FIGS 3a, 3b and 4 are definite illustrations showing detecting elements used in the invention.

DESCRIPTION OF THE PREFERRED EMBODIMENTS

Figure 4:
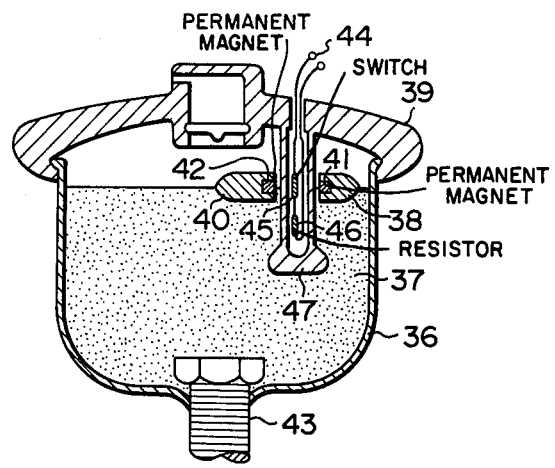

FIGS. 1a and 1b are circuit diagrams for explaining the principle of the invention.

FIG. 1a shows a detecting transformer 1 consisting of an A.C. transformer which is provided with a primary winding 10 and FIG. 1b shows the detecting transformer 1 provided with the primary winding 10, the secondary winding 11 and in addition a control winding 12 as a third winding shown on a single core.

In FIG. 1a, assuming that the turn numbers of the primary and secondary windings are $N_1$ and $N_2$, and impedances thereof are $Z_1$ and $Z_2$, respectively, when a suitable A.C. power source is applied to an input terminal 2 of the primary winding 10, between the voltages $V_1$, $V_2$ of both windings of the detecting transformer 1 excited by said A.C. power source (the voltage appearing at the output terminal 3) and the windings $N_1$, $N_2$, there is the following relation.

$$N_2/N_1 = V_1/V_2 \tag{1}$$

Further, between the windings $N_1$, $N_2$ and the impedances $Z_1$, $Z_2$, there is the following relation.

$$N_1/N_2 = \sqrt{Z_1/Z_2} \tag{2}$$

Accordingly, between the voltages $V_1$, $V_2$ of the primary and secondary windings and the impedances $Z_1$, $Z_2$ thereof, the following equation is established.

$$V_2/V_1 = \sqrt{Z_1/Z_2} \tag{3}$$

In such situation, when the secondary winding 11 is short-circuited, the impedance $Z_2$ thereof and thus said $V_2$ becomes zero. As a result, the impedance $Z_1$ of the primary winding 10 and said $V_1$ become zero. In this case, a resistor 4 for preventing short-circuit of the A.C. power source is not necessarily required in view of the principle of the invention. Nextly, in FIG. 1b, assuming that the impedance of the third winding 12 is $Z_3$, between the secondary winding 11 and the third winding 12, the relation similar to the foregoing is established. That is, when the secondary winding 11 is short-circuited, the voltage across the third winding 12 becomes zero and when it is opened, the following voltage $V_3$ is produced at terminals 5.

$$V_3 = V_1 \sqrt{Z_2/Z_1} \quad (4)$$

Therefore, if the secondary and third windings 11 and 12 are used as the control and output windings, respectively, a controlled output voltage $V_3$ can be obtained from the output terminal 5 of the output winding 12 by switching the terminal 3 of the control winding 11.

So, in the invention, the control terminal 3 of the control winding 11 is provided with a detecting element having the above described direct or indirect switching function and the output winding 5 provided with an output circuit having an indicating or alarm function.

FIG. 2 shows an embodiment of the invention. In the same figure, an A.C. power cource 15 is connected to the primary winding 10 and the one end of the control winding 11 is grounded and the other end thereof is grounded through a detecting component. The one end of the output winding 12 is grounded and the other end thereof is connected to an output circuit comprising a diode 21, a resistor 22, a capacitor 23, a transistor 24, an alarming device 25 and a collector source 26.

Now, supposing that the detecting element 20 is caused to be in the "on" state as described by the solid line, the control winding 11 is in the short-circuited state. Therefore, if the detecting element 20 is in "on" state under normal condition, the control winding 11 is in the short-circuited state and if a condition amount varies and reaches to a certain limit thereof, said detecting element 20 becomes in the "off" state. Accordingly, when the detecting element 20 is in the "on" state, the output signal can not be obtained from the output winding 12 so that the output circuit is not driven.

When the detecting element 20 becomes in the "off" state due to variation of the condition amount as described by a dotted line, an output voltage $V_3$ is obtained from the output winding 12 which is excited by an A.C. voltage from the A.C. power source 15. A negative component in the output voltage $V_3$ is eliminated by the diode 21 and a positive component therein is smoothed by a smoothing circuit consisting of a resistor 22 and a capacitor 23 to provide a D.C. component which is applied to the transistor 24.

The transistor 24 is driven by the D.C. component, thereby to excite the alarm device 25 connected in series with the collector terminal thereof and to cause other alarm device (not shown) to alarm. Of course, the alarm device may be replaced by a suitable indicator.

In addition, the construction of the output circuit is not limited to that of the above-mentioned embodiment. For example, the diode 21 may be connected in the reverse direction to that of FIG. 2a to provide only a negative signal, or the smoothing circuit may be constructed in a manner different from that shown in FIG. 2. Moreover, the transistor 24 may be directly driven by the output signal obtained from the diode 21 without this smoothing circuit. In any event, the above described arrangement may be resorted to without departing from the spirit and the scope of the invention.

FIGS. 3a, 3b and 4 show detecting elements applicable to the invention. In FIGS. 3a and 3b, friction members (brake pads) 31, 34 supported by supporting plates 30, 33 are provided at both sides of a disk 32 attached to the wheel of a car. In such arrangement, the actual brake operation is effected in such a manner that the friction members 31, 34 are pressed to the disk 32 rotating integrally with the wheel to control rotation of the disk 32.

A cavity 35 is provided in the supporting plate 30 and the friction member 31 and the detecting element 20 is inserted into said cavity 35. This detecting element 20 consists of a copper plate 201 and a lead line 200 connected thereto. In such arrangement, during the copper plate 201 wears but does not brake down, it is in normal condition, while when the copper plate brakes down, the line 200 becomes in open state and thereby the abnormality of the brake can be detected. In the foregoing, the detecting element 20 is inserted in the cavity but it may be buried therein.

FIG. 4 shows the brake oil reserve tank of a car. In the tank device, a reserve tank 36 is filled with a brake oil 37 and floats 38, 40 waft on the surface of the brake oil 37. A cap 39 is mounted on the upper surface of the tank 36. An oil pipe 43 communicates with a brake cylinder (not shown). As inserting portion 47 for a detecting element formed integrally with the cap 39 and having a cavity at the inside thereof is provided within the tank 37. The detecting element consisting of a lead switch 45, a resistor 46 and a lead line 44 is inserted into the cavity of the inserting portion 47. Moreover, small permanent magnets 41, 42 are buried within floats 38, 40. Floats 38, 40 and the lead switch 45 are provided to be in alignment with each other so that said lead switch is made in "on" state by permanent magnets 41, 42 disposed within the floats 38, 40 if the volume of the brake oil is a predetermined volume. In such arrangement, when the oil decreases (or increases), floats 38, 40 varies up and down, and as a result, permanent magnets 41, 42 varies so that the lead switch 45 becomes in "off" state. Accordingly, the lead line 44 is switched and acts as a detecting element.

The embodiment shown in FIG. 2 comprises only one detecting element. However it is possible by one output circuit to detect variation of a plurality of condition amounts and to alarm. In the brake device shown in FIG. 3, the same one as the detecting element 20 is also attached to the friction member 34, thereby to detect two condition amounts. Or, detecting elements are secured to both of the brake device shown in FIG. 3 and the brake oil reserve tank shown in FIG. 4.

Figure 5:
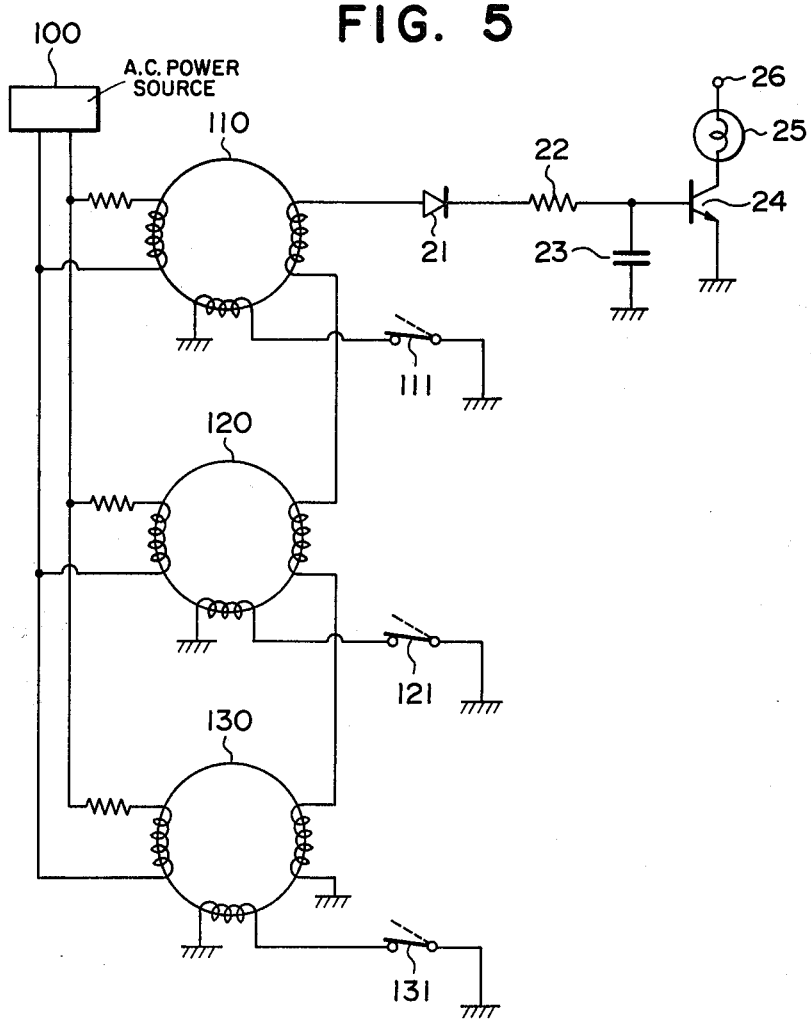
FIGS. 5 and 6 are circuit diagrams showing another embodiment of the invention, respectively.

FIG. 5 shows an embodiment capable of detecting and alarming by means of only one output circuit coupled with such plurality of detecting elements.

In the same figure, each detecting element 111, 121, 131 is connected to a corresponding control winding of each detecting transformer 110, 120, 130 excited by an A.C. power source 100. Output windings of the respective transformers 110, 120, 130 are connected in series with each other and one end of the series connected windings is connected to the output circuit and the other end thereof is grounded.

According to such arrangement, if all detecting elements 111, 121, 131 are in "on" state as shown by the solid lines, all control windings are short-circuited and thus an output signal does not appear at the output circuit. On the other hand, if any one of detecting elements 111, 121, 131 becomes in "off" state, the output signal is produced from the output winding and is applied to the output circuit to indicate and alarm it.

In addition, detecting transformers are provided at each detecting elements, respectively, but it is possible to cause only one detecting transformer to correspond to these detecting elements. Namely, these detecting elements 111, 121, 131 may be connected in series with the control winding of the detecting transformer 110.

Still further, it is possible to detect a plurality of condition amounts by only one detecting transformer in such a manner that the detecting transformer is provided with a plurality of control windings to which detecting elements are connected, respectively. According to such arrangement, function similar to that in FIG. 5 can be attained.

Figure 6:
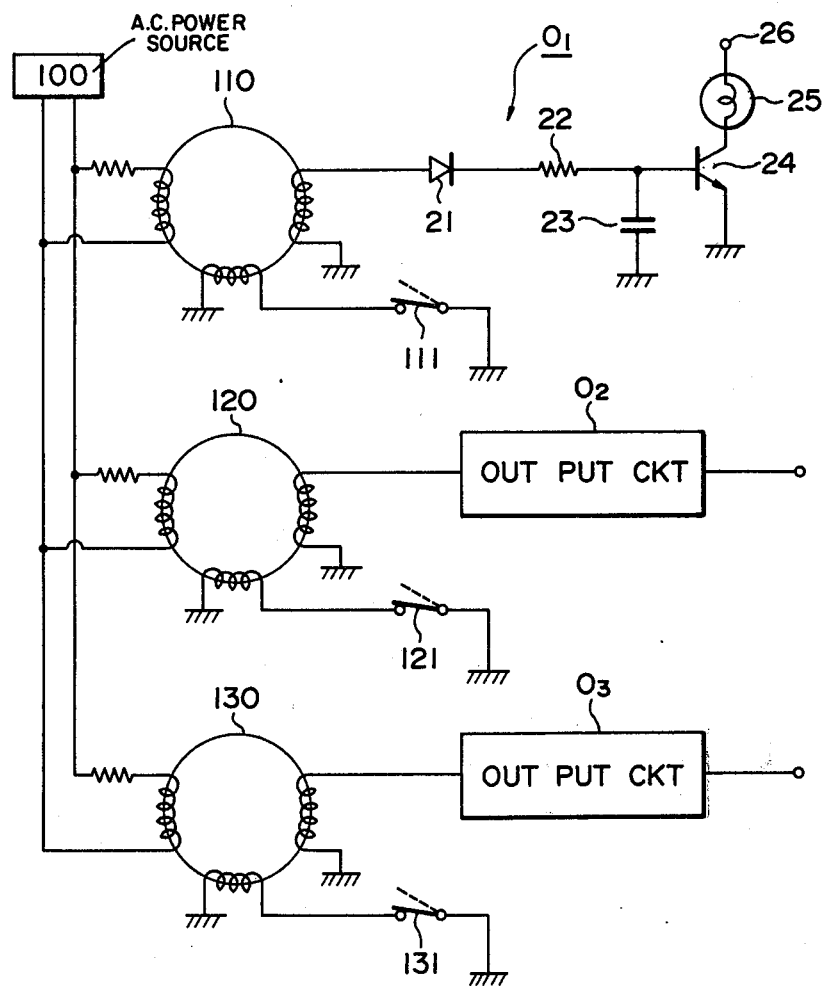

Besides, since only one output circuit is used in the above embodiment, it can not be made clear which switch becomes in "on" state. In order to make this possible, as shown in FIG. 6, each detecting transformer may be provided with an output circuit $0_1 \sim 0_3$.

The embodiment of the above invention employs the method for driving the detecting element depending upon whether a mechanical and physical condition amount exceeds one predetermined limit value.

However, there is a case where with respect to variation of a general mechanical and physical condition amount, not only one limit value but also two or more than three limit values (that is, stepped limit values) are predetermined and an unique measure is required for each limit value.

In the case of such stepped limit values, the invention can be realized by providing the detecting function at each stepped limit value and effecting alarm and indication as above mentioned.

According to the invention, in the brake device of a car and the like, the required condition amount (or an abnormal value) can be reliably detected and further the construction of the invention itself is simple and an inexpensive condition amount detecting apparatus can be provided.

We claim:
1. An apparatus for detecting variation of a condition amount in a mechanical device comprising
    at least one detecting transformer having an input winding, at least one control winding, and an output winding mounted in a single magnetic path,
    an alternating current power source connected to said input winding,
    at least one normally closed circuit detecting element means to detect a variation of a condition amount by opening of said normally closed circuit detecting element means connected between one of two ends of said control winding and ground, and the other of said ends of said control winding connected to ground, and
    output means connected to said output winding to take out an output signal occurring on said output winding when said normally closed circuit detecting element means is open circuited.
2. The apparatus of claim 1, further characterized by said input winding, said at least one control winding, and said output winding mounted on a single core.
3. The apparatus of claim 1, further characterized by said output means including
    a diode having a input and an output with said input connected to said output winding,
    a smoothing circuit having an input and an output with said input of said smoothing circuit connected to said output of said diode,
    an amplifying circuit connected to said output of said smoothing circuit, and
    an alarm means connected to said amplifying circuit and driven thereby to be actuated by opening of said normally closed circuit detecting element means.
4. The apparatus of claim 1, further characterized by said detecting element means including
    a metal plate of abradable metal buried in a supporting plate and a friction member of a brake device with said metal plate located to extend into said friction member to be eroded along with adjacent portions of said friction member, and lead lines connected to said metal plate and to said control winding and said respective ground.
5. The apparatus of claim 4, further characterized by said metal plate positioned in a cavity in said supporting plate and said friction member.
6. The apparatus of claim 4, further characterized by said metal plate embedded in said supporting plate and said friction member.
7. An apparatus for detecting variation of condition amounts in a mechanical device comprising
    a plurality of detecting transformers, each having an input winding, at least one control winding, and an output winding mounted in a single magnetic path,
    an alternating current power source commonly connected to said input winding of each of said plurality of detecting tranformers,
    a plurality of normally closed circuit detecting element means to each detect a variation of a condition amount by opening of said normally closed circuit detecting element means with each detecting element means connected in series with and between a respective one of said control windings and ground, and the other of said ends of each of said control windings connected to ground,
    an output means connected to said output windings to take out an output signal occurring on said output windings when said normally closed circuit detecting element means is open circuited.
8. The apparatus of claim 7, further characterized by said output windings of said plurality of detecting transformers being connected in series with each other.

* * * * *